UNITED STATES PATENT OFFICE.

ALEXANDER ASBOTH, OF NEW YORK, N. Y.

COMPOSITION FOR ROOFING AND CEMENT.

Specification forming part of Letters Patent No. 28,953, dated July 3, 1860.

*To all whom it may concern:*

Be it known that I, ALEXANDER ASBOTH, of No. 55 East Thirteenth street, New York, in the county of New York, in the State of New York, have invented a new and improved concrete suitable for walks, or formed in blocks of any shape for those building purposes in which stone, marble, or brick are now employed, or for a covering for flooring and roofs, or a lining for basements, cellars, drains, and gutters, also for a cement, or connected with iron for a paving in thoroughfares; and I do hereby declare that the following is a full and exact description thereof.

The nature of my invention consists in connecting, by a mixture of litharge and linseed-oil, gravel or broken stone mixed with pounded brick in such a solid manner that the mixture, when dry, attains the consistency of stone, having, however, several advantages over natural stone, insomuch as this concrete can be made in pieces of any shape, form, or stone color, will resist all atmospheric influences, will not soften by the heat of the sun in the hottest climate, and, being impervious to wet or damp, will not crack by frost.

To enable others skilled in the art to make and use my invention, I will proceed to describe the materials to be used and the process to make the concrete, its construction and operation.

I procure clean gravel, but should the gravel contain any loamy or earthy substances I wash it till it is perfectly clean. I next obtain bricks, which I pound or grind to powder. I next take linseed-oil or any other analogous oil, (boiled oil is better than raw,) and if four ounces of sulphur per gallon of oil be added during the boiling its impermeability to damp will be improved for underground purposes. I complete my ingredients by procuring litharge. Upon the quality of the gravel depends the quantity of the ingredients requisite for completing the connection, because a fine gravel, having more amount of surface, uses more oil, and consequently requires more of the connecting material. All the particles should be properly covered with the oil without there being more than sufficient for that purpose, whereby the concrete would be rendered less adhesive and would require a greater time to dry.

As to the proportions, the following is an example which I deem good for roofing and other thin layers from one-fourth to one-half inch thick, using gravel about the size of birdshot:

| | |
|---|---|
| Gravel | 6 parts. |
| Brick, pulverized | 3 " |
| Oil | 1½ " |
| Litharge | 1½ " |
| | 12 |

If the gravel contains larger pieces than in the first example, the proportions should be:

| | |
|---|---|
| Gravel, by measure | 6 parts. |
| Pulverized brick | 3 " |
| Oil | 1 " |
| Litharge | 1 " |
| | 11 |

If slate-gravel be used, which will answer for walks, the following preparation may be adopted:

| | |
|---|---|
| Slate-gravel | 6 parts. |
| River-sand | 2 " |
| Pulverized brick | 2½ " |
| Oil | 1¼ " |
| Litharge | 1¼ " |
| | 13 |

First mix with care and by themselves litharge with the oil, also separately mix the gravel with the pulverized brick. Then unite the two compounds and mix the whole thoroughly, after which the composition can be made into any forms or molds, layers, or coverings, the quantity put on being a little more than the required thickness to which it will be reduced by beating or pressure. As the pressure or beating brings the oil upon the surface, a little fine gravel must be sprinkled thereon, when it must be again beaten, and the process be continued till no more oil appears on the surface. Then it must be left to dry, when any superfluous sand can be brushed off. The time necessary for drying depends upon the thickness of the materials. About four or five days is sufficient to render the surface sufficiently hard for it to protect the lower portion. Walks or roads should, however, be covered by boards for two or three weeks before they be opened to the public as thoroughfares. For roofs it can be exposed directly, since rain makes no impression upon it.

Should it be inconvenient first to make the two separate compounds as directed above, the dry substances may be mixed together and then the oil poured in; but in that case the whole will not be so equally mingled, and the result will consequently be less perfect.

What I claim as my invention, and desire to secure by Letters Patent, is—

The mode herein described of making a concrete by the mixture of gravel powdered brick, brick, oil, and litharge.

ALEXANDER ASBOTH.

Witnesses:
FRANCIS P. SWEET,
HORACE ANDREWS.